(12) United States Patent
Liang et al.

(10) Patent No.: US 12,362,868 B2
(45) Date of Patent: Jul. 15, 2025

(54) USER EQUIPMENT FOR MANAGING FEEDBACK AND METHOD THEREOF

(71) Applicant: NEC Corporation, Tokyo (JP)

(72) Inventors: Caroline Quanyi Liang, London (GB); Robert Arnott, London (GB)

(73) Assignee: NEC CORPORATION, Tokyo (JP)

( * ) Notice: Subject to any disclaimer, the term of this patent is extended or adjusted under 35 U.S.C. 154(b) by 449 days.

(21) Appl. No.: 17/429,808

(22) PCT Filed: Jan. 29, 2020

(86) PCT No.: PCT/JP2020/003130
§ 371 (c)(1),
(2) Date: Aug. 10, 2021

(87) PCT Pub. No.: WO2020/166334
PCT Pub. Date: Aug. 20, 2020

(65) Prior Publication Data
US 2022/0123875 A1    Apr. 21, 2022

(30) Foreign Application Priority Data

Feb. 15, 2019  (GB) ...................................... 1902166

(51) Int. Cl.
*H04L 1/18*  (2023.01)
*H04L 1/1829*  (2023.01)
*H04L 5/00*  (2006.01)

(52) U.S. Cl.
CPC .......... *H04L 1/1854* (2013.01); *H04L 1/1861* (2013.01); *H04L 5/0055* (2013.01)

(58) Field of Classification Search
CPC ... H04L 1/1854; H04L 1/1861; H04L 5/0055; H04L 5/0051; H04W 52/146; H04W 52/36; H04W 52/10; H04W 52/08; H04W 72/046; H04W 72/044; H04B 7/0695
See application file for complete search history.

(56) References Cited

U.S. PATENT DOCUMENTS

| | | | |
|---|---|---|---|
| 2018/0019843 A1 | 1/2018 | Papasakellariou | |
| 2020/0196343 A1* | 6/2020 | Marinier | H04L 1/1896 |
| 2020/0205173 A1* | 6/2020 | Frederiksen | H04L 1/1819 |
| 2020/0344032 A1* | 10/2020 | Yang | H04L 5/0053 |

(Continued)

OTHER PUBLICATIONS

Japanese Office Action for JP Application No. 2021-544871, mailed on Sep. 27, 2022 with English Translation.

(Continued)

*Primary Examiner* — Wei Zhao
(74) *Attorney, Agent, or Firm* — Sughrue Mion, PLLC

(57) ABSTRACT

A communication system is disclosed in which a user equipment (UE) receives downlink control information (DCI) in accordance with at least one of a first DCI format and a second DCI format, the DCI indicating at least one communication resource to be used for transmitting Hybrid Automatic Repeat Request Acknowledgement (HARQ-ACK) feedback for downlink data at a symbol or sub-slot level, and the DCI format used indicating whether a timing window in which said downlink data is to be transmitted is shorter or longer than a slot length. The UE receives downlink data during said timing window and transmits corresponding HARQ-ACK using the indicated at least one communication resource.

6 Claims, 7 Drawing Sheets

(56) References Cited

U.S. PATENT DOCUMENTS

| | | | | |
|---|---|---|---|---|
| 2021/0144694 A1* | 5/2021 | Lee | ............... | H04L 1/1812 |
| 2021/0168779 A1* | 6/2021 | Mondal | ............... | H04L 5/0035 |
| 2021/0329622 A1* | 10/2021 | Yin | ............... | H04L 1/1861 |

OTHER PUBLICATIONS

LG Electronics, "UCI enhancements for NA URLLC", 3GPP TSG RAN WG1 Ad-Hoc Meeting 1901, R1-1900592, Jan. 21-25, 2019, Taipei, Taiwan.

Fujitsu, "Discussion on supporting multiple PUCCHs for HARQ-ACK in a slot", 3GPP TSG RAN WG1 Ad-Hoc Meeting 1901, R1-1900255, Jan. 21-25, 2019, Taipei, Taiwan.

Oppo, "Offline summary on UCI enhancements for URLLC", 3GPP TSG RAN WG1 Ad-Hoc Meeting 1901, R1-1901401, Jan. 21-25, 2019, Taipei, Taiwan.

NEC. "UCI enhancements for NR URLLC", 3GPP TSG RAN WG1 #96, R1-1902531, Feb. 25-Mar. 1, 2019, Athens, Greece.

International Search Report for PCT Application No. PCT/JP2020/003130, mailed on Jul. 2, 2020.

English translation of Written opinion for PCT Application No. PCT/JP2020/003130, mailed on Jul. 2, 2020.

Great Britain Search Report for GB Application No. 1902166.6 mailed on Jul. 19, 2019.

3rd Generation Partnership Project, "Technical Specification Group Radio Access Network; Evolved Universal Terrestrial Radio Access (E-UTRA) and NR; Multi-connectivity; Stage 2 (Release 15)", 3GPP TS 38.300 V15.4.0, Dec. 2018, pp. 1-97.

3rd Generation Partnership Project, "Technical Specification Group Radio Access Network; NR; NR and NG-RAN Overall Description; Stage 2 (Release 15)", 3GPP TS 37.340 V15.4.0, Dec. 2018, pp. 1-67.

3rd Generation Partnership Project, "Technical Specification Group Radio Access Network; NR; Physical layer procedures for control (Release 15)", 3GPP TS 38.213 V15.3.0, Sep. 2018, pp. 1-101.

3rd Generation Partnership Project, "Technical Specification Group Radio Access Network; NR; Radio Resource Control (RRC) protocol specification (Release 15)", 3GPP TS 38.331 V15.4.0, Dec. 2018, pp. 1-474.

3rd Generation Partnership Project, "Technical Specification Group Radio Access Network; NR; Multiplexing and channel coding (Release 15)", 3GPP TS 38.212 V15.4.0, Dec. 2018, pp. 1-100.

NTT Docomo, Inc., "UCI enhancements for URLLC", 3GPP R1-1900970, 3GPP TSG RAN WG1 Ad-Hoc Meeting 1901, Taipei, Jan. 21-25, 2019.

OPPO, "UCI enhancements for URLLC", 3GPP R1-1900282, 3GPP TSG RAN WG1 Ad-Hoc Meeting 1901, Taipei, Jan. 21-25, 2019.

WILUS Inc., "Remaining Issues on HARQ-ACK codebook construction", 3GPP R1-1807236, 3GPP TSG RAN WG1 Meeting #93, Busan, Korea, May 21-25, 2018.

\* cited by examiner

USER EQUIPMENT FOR MANAGING FEEDBACK AND METHOD THEREOF

This application is a National Stage Entry of PCT/JP2020/003130 filed on Jan. 29, 2020, which claims priority from Great Britain Patent Application 1902166.6 filed on Feb. 15, 2019, the contents of all of which are incorporated herein by reference, in their entirety.

TECHNICAL FIELD

The present invention relates to a wireless communication system and devices thereof operating according to the 3rd Generation Partnership Project (3GPP) standards or equivalents or derivatives thereof. The disclosure has particular but not exclusive relevance to improvements relating to Ultra-Reliable and Low-Latency Communications in the so-called '5G' (or 'Next Generation') systems.

BACKGROUND ART

The latest developments of the 3GPP standards are the so-called '5G' or 'New Radio' (NR) standards which refer to an evolving communication technology that is expected to support a variety of applications and services such as Machine Type Communications (MTC), Internet of Things (IoT) communications, vehicular communications and autonomous cars, high resolution video streaming, smart city services, and/or the like. 3GPP intends to support 5G by way of the so-called 3GPP Next Generation (NextGen) radio access network (RAN) and the 3GPP NextGen core (NGC) network. Various details of 5G networks are described in, for example, the 'NGMN 5G White Paper' V1.0 by the Next Generation Mobile Networks (NGMN) Alliance, which document is available from https://www.ngmn.org/5g-white-paper.html.

End-user communication devices are commonly referred to as User Equipment (UE) which may be operated by a human or comprise automated (MTC/IoT) devices. Whilst a base station of a 5G/NR communication system is commonly referred to as a New Radio Base Station ('NR-BS') or as a 'gNB' it will be appreciated that they may be referred to using the term 'eNB' (or 5G/NR eNB) which is more typically associated with Long Term Evolution (LTE) base stations (also commonly referred to as '4G' base stations). 3GPP Technical Specification (TS) 38.300 V15.4.0 and TS 37.340 V15.4.0 define the following nodes, amongst others:

gNB: node providing NR user plane and control plane protocol terminations towards the UE, and connected via the NG interface to the 5G core network (5GC).

ng-eNB: node providing Evolved Universal Terrestrial Radio Access (E-UTRA) user plane and control plane protocol terminations towards the UE, and connected via the NG interface to the 5GC.

En-gNB: node providing NR user plane and control plane protocol terminations towards the UE, and acting as Secondary Node in E-UTRA-NR Dual Connectivity (EN-DC).

NG-RAN node: either a gNB or an ng-eNB.

3GPP also defined the so-called 'Xn' interface as the network interface between neighbouring NG-RAN nodes.

The next-generation mobile networks support diversified service requirements, which have been classified into three categories by the International Telecommunication Union (ITU): Enhanced Mobile Broadband (eMBB); Ultra-Reliable and Low-Latency Communications (URLLC); and Massive Machine Type Communications (mMTC). eMBB aims to provide enhanced support of conventional mobile broadband, with focus on services requiring large and guaranteed bandwidth such as High Definition (HD) video, Virtual Reality (VR), and Augmented Reality (AR). URLLC is a requirement for critical applications such as automated driving and factory automation, which require guaranteed access within a very short time. MMTC needs to support massive number of connected devices such as smart metering and environment monitoring but can usually tolerate certain access delay. It will be appreciated that some of these applications may have relatively lenient Quality of Service/Quality of Experience (QoS/QoE) requirements, while some applications may have relatively stringent QoS/QoE requirements (e.g. high bandwidth and/or low latency).

The Physical Uplink Control Channel (PUCCH) carries a set of information called Uplink Control Information (UCI). The format of the PUCCH depends on what kind of information the UCI carries. The PUCCH format to be used is determined by how many bits of information should be carried and how many symbols are assigned. The UCI used in NR (5G) includes one or more of the following information: Channel State Information (CSI); ACK/NAK; and Scheduling Request (SR). This is generally the same as in LTE (4G).

The location of the PUCCH (in time and frequency domain) is determined by the location of the resource sets carrying the PUCCH. Specifically, the PUCCH resource set location is determined based on its starting Physical Resource Block (PRB), its starting symbol, the number of PRBs and the number of symbols used.

Regarding the PUCCH resource sets, section 9.2.1 of 3GPP TS 38.213 V15.3.0 states that if a UE provides HARQ-ACK information in a PUCCH transmission in response to detecting a DCI format 1_0 or DCI format 1_1, the UE determines a PUCCH resource with index $r_{PUCCH}$, where $0 \le r_{PUCCH} \le 15$.

Moreover, if a UE has a dedicated PUCCH resource configuration, the UE is provided by higher layers with one or more PUCCH resources. Each PUCCH resource includes the following parameters:

a PUCCH resource index provided by higher layer parameter pucch-ResourceId;

an index of the first PRB prior to frequency hopping or for no frequency hopping by higher layer parameter startingPRB;

an index of the first PRB after frequency hopping by higher layer parameter secondHopPRB;

an indication for intra-slot frequency hopping by higher layer parameter intraSlotFrequencyHopping; and a configuration for a PUCCH format, from PUCCH format 0 through PUCCH format 4, provided by a higher layer parameter format.

Section 9.2.3 of 3GPP TS 38.213 specifies that, in NR Release-15, for DCI format 1_0, the PDSCH-to-HARQ-timing-indicator field values map to {1, 2, 3, 4, 5, 6, 7, 8}. For DCI format 1_1, if present, the PDSCH-to-HARQ-timing-indicator field values map to values for a set of number of slots provided by higher layer parameter dl-DataToUL-ACK (as defined in Table 9.2.3-1 of 3GPP TS 38.213).

In Release-15, the PUCCH resource ID is determined by the index of the first Control Channel Element (CCE) for Physical Downlink Control Channel (PDCCH) reception, and the PUCCH resource indicator field in the Downlink Control Information (DCI). Therefore, the location of the DCI has to be transmitted on a CCE index that can be used to reference an intended PUCCH resource. If that CCE is already used by another UE, the DCI cannot be sent on the desired CCE, and may result in so-called 'CCE blocking' or scheduling delay (since $n_{CCE,0}$ may only become available at later scheduling occasions).

If the UE provides HARQ-ACK information in a PUCCH transmission in response to detecting a DCI format 1_0 or DCI format 1_1, the UE determines a PUCCH resource with index $r_{PUCCH}$, $0 \leq r_{PUCCH} \leq 15$, as $$r_{PUCCH} = \left\lfloor \frac{2 \cdot n_{CCE,0}}{N_{CCE}} \right\rfloor + 2 \cdot \Delta_{PRI},$$

where $N_{CCE}$ is a number of CCEs in a CORESET of a PDCCH reception with DCI format 1_0 or DCI format 1_1, $n_{CCE,0}$ is the index of a first CCE for the PDCCH reception, and $\Delta_{PRI}$ is a value of the PUCCH resource indicator field in the DCI format 1_0 or DCI format 1_1.

3GPP TS 38.331 V15.4.0 specifies that PUCCH resources of format0 and format1 are only allowed in the first PUCCH resource set, i.e., in a PUCCH-ResourceSet with pucch-ResourceSetId=0. This set may contain between 1 and 32 resources. PUCCH resources of format2, format3 and format4 are only allowed in a PUCCH-ResourceSet with pucch-ResourceSetId>0. If present, these sets contain between 1 and 8 resources each.

Even though the start symbol can be placed at 'any' Orthogonal Frequency Division Multiplexing (OFDM) symbols from the above definition, the network can only configure a subset of them due to limited number of PUCCH resource configurations. When there are multiple PUCCH transmissions in a slot, the location of 'startSymbol' will have to ensure that there is no collision within the same slot as well as satisfying the timeline requirement.

3GPP also intends to support multiple PUCCHs for Hybrid Automatic Repeat Request Acknowledgement (HARQ-ACK) within a slot in Release-16. In order to implement this functionality, one or more of the following issues needs to be addressed:

How to separate HARQ-ACK multiplexing windows for different PUCCHs?
How to indicate the starting symbol of different PUCCHs?
How to indicate the slot timing value 'K$_1$', e.g. in unit of slot, half-slot, a number of symbols or symbol?
How to determine dynamic HARQ codebook?
How to determine semi-static HARQ-ACK codebook?
How to configure PUCCH resource sets, e.g. Reuse R15 PUCCH resource set configurations or not?
How to determine PUCCH resource for each PUCCH?
How to do PUCCH resource overriding for HARQ-ACK multiplexing?
What is the maximum number of PUCCH transmissions for HARQ-ACK allowed in a slot?

SUMMARY OF INVENTION

It has been agreed in 3GPP that for a Release-16 UE at least two HARQ-ACK codebooks can be simultaneously constructed for supporting different service types for the UE. However, details of the relevant procedures, details of how to identify the applicable HARQ-ACK codebook, and applicability of a semi-static HARQ-ACK codebook and/or a dynamic HARQ-ACK codebook, are still not known.

Accordingly, the present invention seeks to provide methods and associated apparatus that address or at least alleviate (at least some of) the above described issues.

Although for efficiency of understanding for those of skill in the art, the invention will be described in detail in the context of a 3GPP system (5G networks), the principles of the invention can be applied to other systems as well.

The present invention provides a method performed by a user equipment (UE), the method comprising: receiving downlink control information (DCI) in accordance with at least one of a first DCI format and a second DCI format, the DCI indicating at least one communication resource to be used for transmitting Hybrid Automatic Repeat Request Acknowledgement (HARQ-ACK) feedback for downlink data at a symbol or sub-slot level, and the DCI format used indicating whether a timing window in which said downlink data is to be transmitted is shorter or longer than a slot length; receiving downlink data during said timing window; and transmitting HARQ-ACK for the received downlink data using the indicated at least one communication resource.

The present invention provides a method performed by a user equipment (UE), the method comprising: receiving downlink control information (DCI) comprising a PUCCH resource indicator field (ΔPRI); determining, for a Physical Uplink Control Channel (PUCCH), a starting communication resource in a slot comprising a set of communication resources to be equal to a value of the PUCCH resource indicator field (ΔPRI); and transmitting, HARQ-ACK for the received downlink data, starting from the determined starting communication resource.

The present invention provides a method performed by a user equipment (UE), the method comprising: monitoring a series of Physical Downlink Control Channel (PDCCH) monitoring occasions; receiving, in a PDCCH monitoring occasion, downlink control information (DCI); receiving, over a Physical Downlink Shared Channel (PDSCH), downlink data corresponding to the DCI; and maintaining a codebook, for use in transmitting Hybrid Automatic Repeat Request Acknowledgement (HARQ-ACK) feedback for the downlink data, including: updating a first counter (e.g. 'C-DAI') based on an accumulative number of {serving cell, PDCCH monitoring occasion} pair(s) for PDSCH reception(s) associated with the DCI up to the current serving cell and current PDCCH monitoring occasion, first in increasing order of serving cell index and then in increasing order of PDCCH monitoring occasion index; and updating a second counter (e.g. 'T-DAI') based on a total number of slot/sub-slot(s)/multiple-slots in which PDSCH transmission(s) associated with the DCI occurred up to the current slot/sub-slot/multiple-slots, in increasing order of slot/sub-slot/multiple-slots index.

Exemplary aspects of the invention extend to corresponding systems, apparatus, and computer program products such as computer readable storage media having instructions stored thereon which are operable to program a programmable processor to carry out a method as described in the exemplary aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Exemplary embodiments of the invention will now be described, by way of example, with reference to the accompanying drawings in which.

DESCRIPTION OF EMBODIMENTS

Overview

Under the 3GPP standards, a NodeB (or an 'eNB' in LTE, 'gNB' in 5G) is a base station via which communication devices (user equipment or 'UE') connect to a core network and communicate to other communication devices or remote servers. Communication devices might be, for example, mobile communication devices such as mobile telephones, smartphones, smart watches, personal digital assistants, laptop/tablet computers, web browsers, e-book readers, and/or the like. Such mobile (or even generally stationary) devices are typically operated by a user (and hence they are often collectively referred to as user equipment, 'UE') although it is also possible to connect IoT devices and similar MTC devices to the network. For simplicity, the present application will use the term base station to refer to any such base stations and use the term mobile device or UE to refer to any such communication device.

Figure 1:
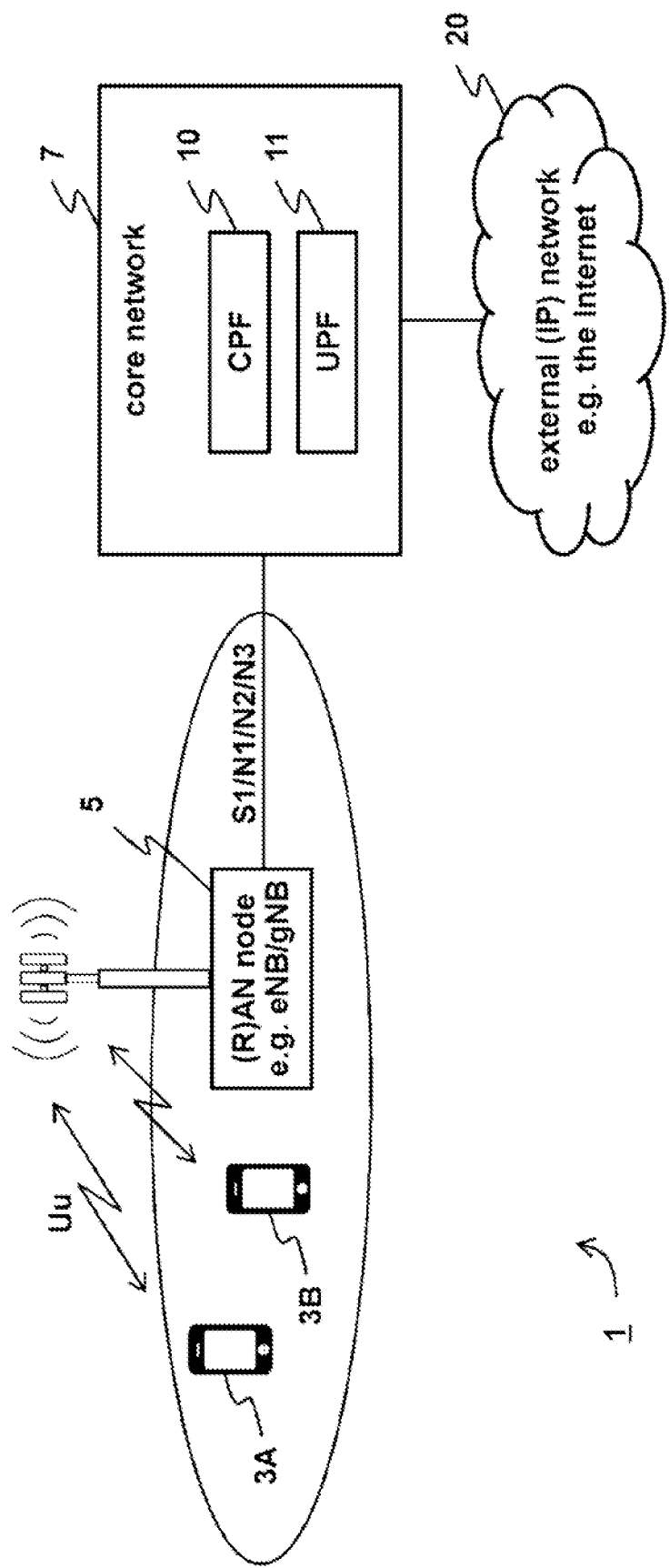
FIG. 1 illustrates schematically a mobile (cellular or wireless) telecommunication system to which exemplary embodiments of the invention may be applied.

FIG. 1 illustrates schematically a mobile (cellular or wireless) telecommunication system 1 to which exemplary embodiments of the invention may be applied.

In this system 1, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst two mobile devices 3A and 3B and one base station 5 are shown in FIG. 1 for illustration purposes, the system, when implemented, will typically include other base stations and mobile devices (UEs).

Each base station 5 controls one or more associated cells (either directly or via other nodes such as home base stations, relays, remote radio heads, distributed units, and/or the like). A base station 5 that supports E-UTRA/4G protocols may be referred to as an 'eNB' and a base station 5 that supports NextGeneration/5G protocols may be referred to as a 'gNBs'. It will be appreciated that some base stations 5 may be configured to support both 4G and 5G protocols, and/or any other 3GPP or non-3GPP communication protocols.

The mobile devices 3 and their serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N1', 'N2', 'N3' interface, and/or the like).

The core network 7 (e.g. the EPC in case of LTE or the NGC in case of NR/5G) typically includes logical nodes (or 'functions') for supporting communication in the telecommunication system 1, and for subscriber management, mobility management, charging, security, call/session management (amongst others). For example, the core network 7 of a 'Next Generation'/5G system will include user plane entities and control plane entities. In this example, the core network includes at least one control plane function (CPF) 10 and at least one user plane function (UPF) 11. It will be appreciated that the core network 7 may also include one or more of the following: an Access and Mobility Function (AMF), a Session Management Function (SMF), a Policy Control Function (PCF), an Application Function (AF), an Authentication Server Function (AUSF), a Unified Data Management (UDM) entity, amongst others. The core network 7 is also coupled (via the UPF 11) to a Data Network (DN) 20, such as the Internet or a similar Internet Protocol (IP) based network (denoted 'external network' in FIG. 1).

It will be appreciated that each mobile device 3 may support one or more services which may fall into one of the categories defined above (URLLC/eMBB/mMTC). Each service will typically have associated requirements (e.g. latency/data rate/packet loss requirements, etc.), which may be different for different services.

Data packets for a particular UE 3 may be transmitted using dynamic scheduling and/or using pre-allocated communication resources (e.g. by semi-persistent scheduling or configured grant).

Even though the start symbol of a PUCCH resource set can be placed at 'any' OFDM symbol, the network can only configure a subset of these symbols due to the limited number of PUCCH resource configurations possible. When there are multiple PUCCH transmissions in a slot, the location of 'startSymbol' needs to be selected such that there is no collision within the same slot whilst timeline requirement is also satisfied.

One option is therefore to increase the size of PUCCH resource set, including that for more than two UCI bits with HARQ-ACK. Specifically, for a slot timing value $K_1$ less than a slot, the indicated symbols or sub-slot can be sufficient to determine the HARQ-ACK multiplexing windows for different Physical Downlink Shared Channels (PDSCHs) without the need of additional indication at the slot level.

However, it may not always be possible to indicate the desired 'start symbol', considering that the 'number of symbols' and the 'number of PRBs' etc. also need to be correctly selected by the same PUCCH resource ID. Furthermore, the above option may not solve the problem of CCE blocking.

Therefore, in another option, the CCE part is removed from the Release-15 formula for determining the 'PUCCH resource ID' for URLLC service (i.e. from the formula $$r_{PUCCH} = \left\lfloor \frac{2 \cdot n_{CCE,0}}{N_{CCE}} \right\rfloor + 2 \cdot \Delta_{PRI}).$$

Specifically, the PUCCH resource index $r_{PUCCH}$ may be determined using the formula:

$$r_{PUCCH} = \Delta_{PRI}$$

Thus, for a slot timing value $K_1$ that spans more than one slot, the starting point of the indicated symbols or sub-slot is from the end of the slot level indication, i.e. relative to the start of the next slot.

Beneficially, the following codebooks may be used the above described system:
semi-static codebook
 ACK/NACK bits=11 00 00 10
 sub-slot 0 (C-DAI=0; C-DAI=1)
 sub-slot 1 (C-DAI=2, C-DAI=3)
 sub-slot 2 (C-DAI=0, C-DAI=1)
 sub-slot 3 (C-DAI=2)
dynamic codebook
 ACK/NACK bits=11 00 00 10
 sub-slot 0 (C-DAI=0, T-DAI=0; C-DAI=1, T-DAI=0)
 sub-slot 1 (C-DAI=2, T-DAI=1; C-DAI=3, T-DAI=1)
 sub-slot 2 (C-DAI=0, T-DAI=2; C-DAI=1, T-DAI=2)
 sub-slot 3 (C-DAI=2, T-DAI=3)
 (note: maximum two PDSCHs per sub-slot are configured in these examples)

Beneficially, the above described system improves the currently used UCI in order to allow multiple PUCCHs within a slot, and provides more reliable HARQ-ACK feedback and prioritization of URLLC and eMBB transmissions.

User Equipment (UE)

Figure 2:
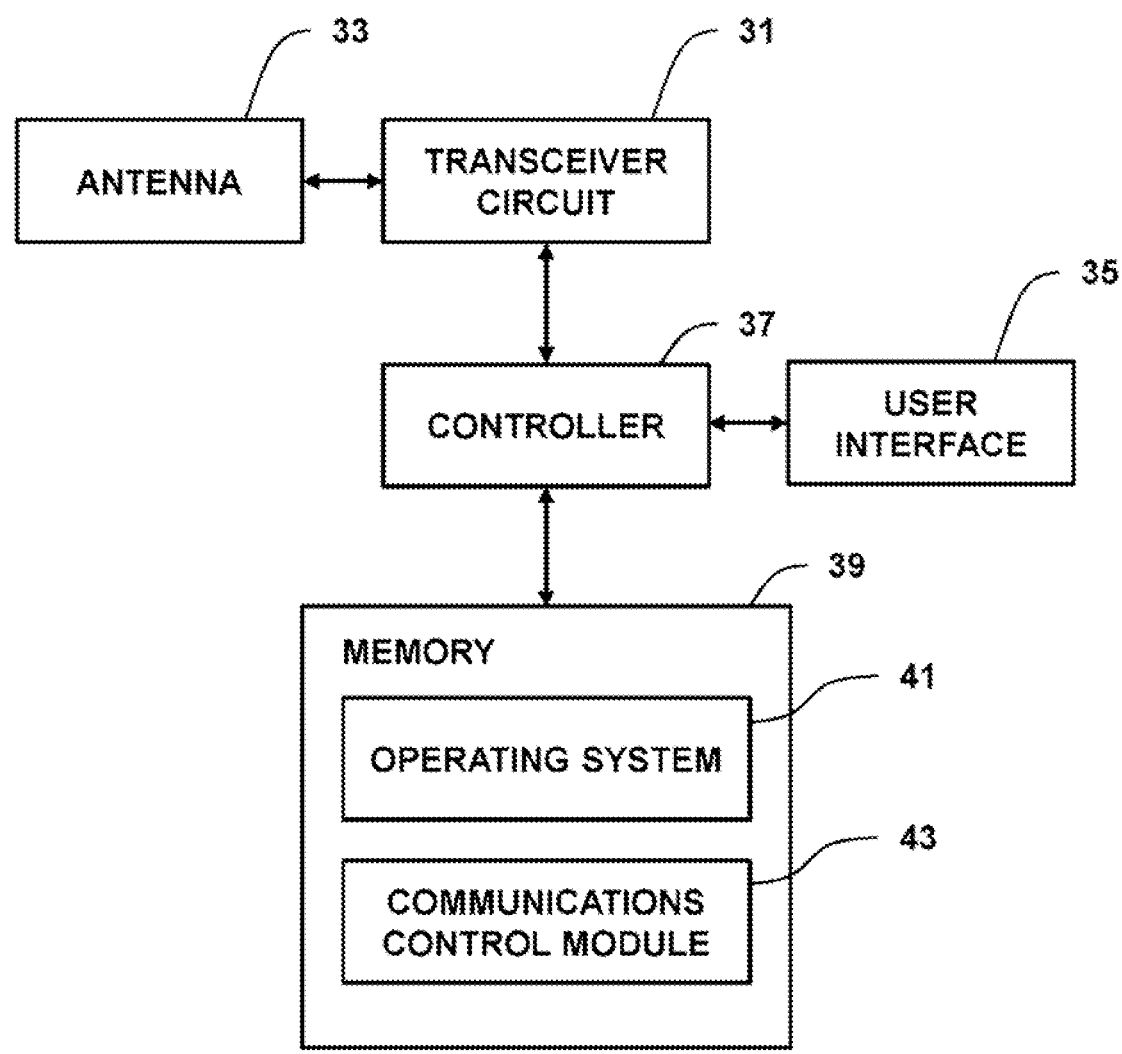
FIG. 2 is a schematic block diagram of a mobile device forming part of the system shown in FIG. 1.

FIG. 2 is a block diagram illustrating the main components of the mobile device (UE) 3 shown in FIG. 1. As shown, the UE 3 includes a transceiver circuit 31 which is operable to transmit signals to and to receive signals from the connected node(s) via one or more antenna 33. Although not necessarily shown in FIG. 2, the UE 3 will of course have all the usual functionality of a conventional mobile device (such as a user interface 35) and this may be provided by any one or any combination of hardware, software and firmware, as appropriate. A controller 37 controls the operation of the UE 3 in accordance with software stored in a memory 39. The software may be pre-installed in the memory 39 and/or may be downloaded via the telecommunication network 1 or from a removable data storage device (RMD), for example. The software includes, among other things, an operating system 41, and a communications control module 43.

The communications control module 43 is responsible for handling (generating/sending/receiving) signalling messages and uplink/downlink data packets between the UE 3 and other nodes, including (R)AN nodes 5 and core network nodes. The signalling may comprise control signalling (including UCI and DCI) related to the PUCCH and/or PDCCH (amongst others). The communications control module 43 is also responsible for determining the resource sets and codebooks to be used for a particular channel.

Access Network Node (Base Station)

Figure 3:
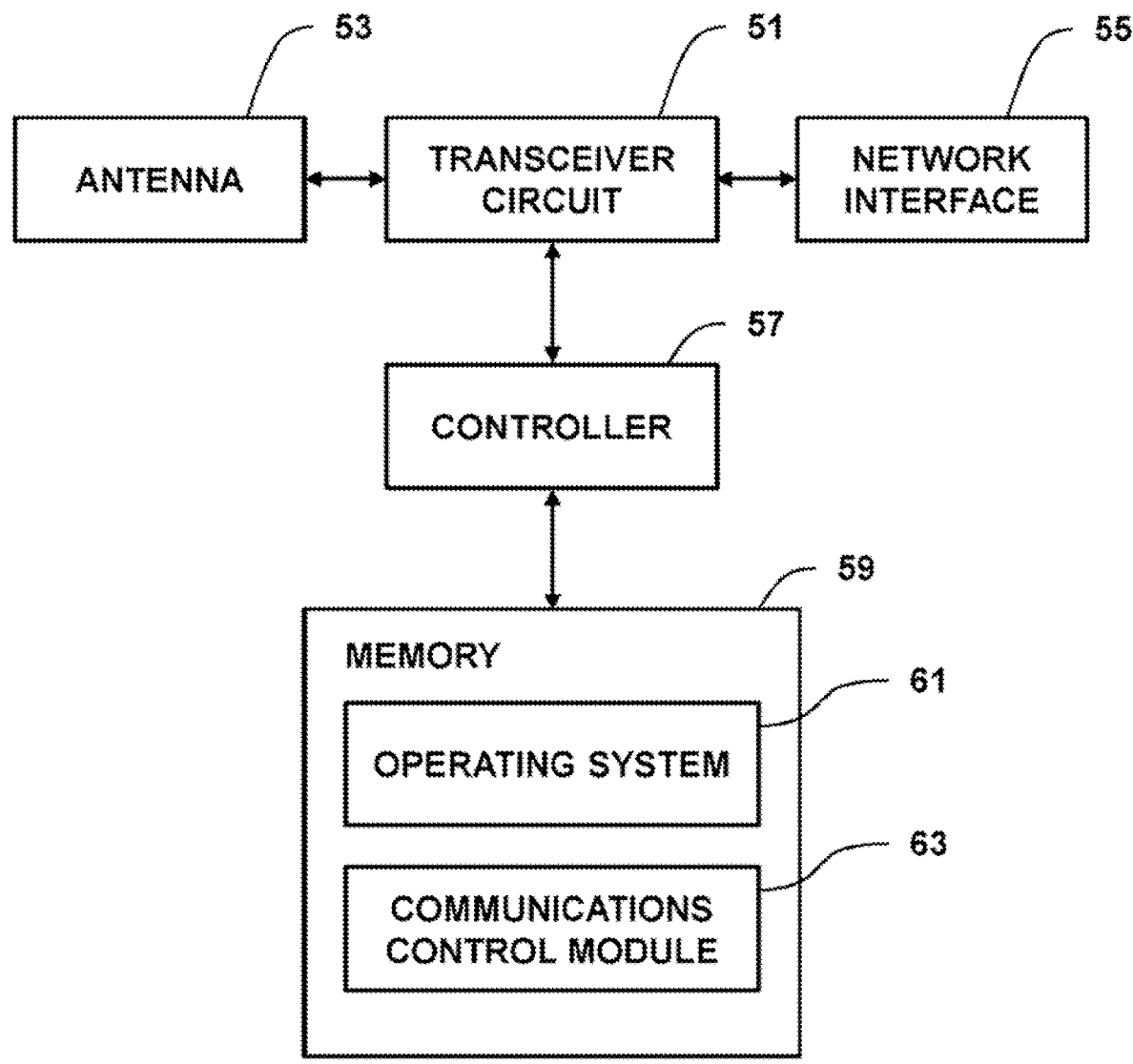
FIG. 3 is a schematic block diagram of an access network node (e.g. base station) forming part of the system shown in FIG. 1.

FIG. 3 is a block diagram illustrating the main components of the base station 5 (or a similar access network node) shown in FIG. 1. As shown, the base station 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station—base station interface (such as X2/Xn) and an appropriate base station—core network interface (such as S1/N1/N2/N3). A controller 57 controls the operation of the base station 5 in accordance with software stored in a memory 59. The software may be pre-installed in the memory 59 and/or may be downloaded via the telecommunication network 1 or from a removable data storage device (RMD), for example. The software includes, among other things, an operating system 61, and a communications control module 63.

The communications control module 63 is responsible for handling (generating/sending/receiving) signalling between the base station 5 and other nodes, such as the UE 3 and the core network nodes. The signalling may comprise control signalling (including UCI and DCI) related to the PUCCH and/or PDCCH (amongst others). The communications control module 63 is also responsible for determining the resource sets and codebooks for a particular channel.

Core Network Function

Figure 4:
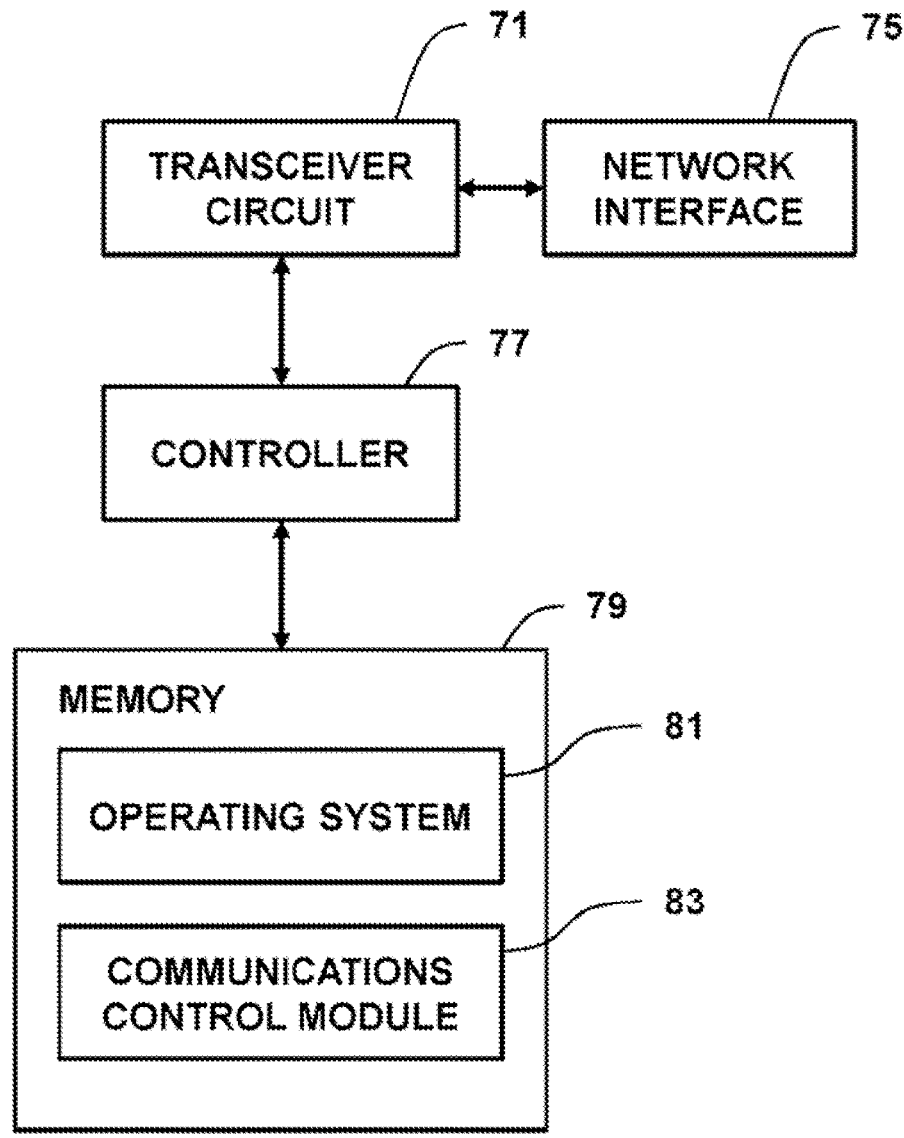
FIG. 4 is a schematic block diagram of a core network node forming part of the system shown in FIG. 1.

FIG. 4 is a block diagram illustrating the main components of a generic core network function, such as the UPF 11 or the AMF 12 shown in FIG. 1. As shown, the core network function includes a transceiver circuit 71 which is operable to transmit signals to and to receive signals from other nodes (including the UE 3, the base station 5, and other core network nodes) via a network interface 75. A controller 77 controls the operation of the core network function in accordance with software stored in a memory 79. The software may be pre-installed in the memory 79 and/or may be downloaded via the telecommunication network 1 or from a removable data storage device (RMD), for example. The software includes, among other things, an operating system 81, and a communications control module 83.

The communications control module 83 is responsible for handling (generating/sending/receiving) signaling between the core network function and other nodes, such as the UE 3, the base station 5, and other core network nodes.

DETAILED DESCRIPTION

A more detailed description of some exemplary embodiments and features is provided below with reference to FIGS. 5 to 7.

Separate HARQ-ACK Multiplexing Widows for Different PUCCHs

As described above, multiple PUCCHs for HARQ-ACK transmission may be provided within a single slot. For example, one PUCCH may be provided for HARQ-ACK associated with one URLLC service and another PUCCH may be provided for HARQ-ACK associated with a different URLLC service. Alternatively, one PUCCH may be provided for URLLC and another PUCCH for a different type of service (non-URLLC).

In order to support higher reliability and lower latency requirements of URLLC traffic (compared to other type of traffic), separate HARQ-ACK multiplexing windows may be supported for eMBB and URLLC. Firstly, the different service types need to be identifiable by the UE 3. A simple method is to reuse the 'MCS-C-RNTI' radio network temporary identifier for the identification of URLLC scheduling via the DCI. Secondly, separate HARQ-ACK multiplexing windows for different PUCCHs of the same service type can be determined based on $K_1$. To support multiple PUCCHs for HARQ-ACK within a slot for URLLC, it is beneficial for $K_1$ to be indicated in finer unit in addition to the slot-level HARQ feedback timing. The indicated $K_1$ can then be used directly to determine the HARQ-ACK multiplexing windows for different PUCCHs within a slot.

Multiple PUCCHs within a slot can enable separate HARQ feedback for intra-UE URLLC and eMBB services (i.e. URLLC and eMBB services for the same UE 3). PUCCHs with partially overlapping or completely overlapping HARQ-ACK multiplexing windows can be separated by Time Division Multiplexing (TDM) or Frequency Division Multiplexing (FDM). If there are frequency domain resources available, eMBB and URLLC PUCCHs may be transmitted simultaneously in the uplink (UL).

For URLLC, it is beneficial for $K_1$ to be indicated in unit of symbol(s) or sub-slot in addition to slot-level HARQ feedback timing.

This description considers at least the following two cases:
  (i) For $K_1$ indicated by symbols only (e.g. multiplexing window is less than a slot), the indicated symbols or sub-slot can be sufficient to determine the HARQ-ACK multiplexing windows for different PDSCHs without the need of additional indication at the slot level.
  (ii) For $K_1$ indicated by slot and optionally symbols (e.g. multiplexing window spans more than a slot), the starting point of the indicated symbols or sub-slot is from the end of the slot level indication, i.e. relative to the start of the next slot.

The downlink (DL) association set is determined based on the configured set of HARQ-ACK timings (for example, when scheduling a UE 3 by DCI format 1_0 on a set of limited timing values provided by a list of symbols {2,4,6, 8,10,12,14,16} or multiple of these symbol values, or sub-slots {0,1,2,3,4,5,6,7} or multiple of these sub-slot values). For a non-slot based URLLC service, the PDSCH-to-HARQ-timing-indicator field can be relative to the last symbol of PDSCH, or just the absolute symbol number after the end of PDSCH, as appropriate.

For scheduling with DCI format 1_1, the slot timing values may be provided by higher layer parameter DL-data-DL-acknowledgement (and/or the like). The dl-DataToUL-ACK values can be updated to indicate the number of slots, number of symbols/sub-slots or a combination of both, provided by higher layer parameter Slot-symbol-timing-value-K1. The timing values can be determined by the union of slot values {0, 1} and a set of symbol values, for example {0,4,8,12} or sub-slot values {0,1,2,3}.

For a URLLC service, the indicated slot and symbol/sub-slot values may be used directly to determine separate HARQ-ACK multiplexing windows for different PUCCH, and the start symbol of PUCCH.

A benefit associated with indicating $K_1$ in unit of sub-slot is that Release-15 mechanisms can be re-used. Benefits associated with indicating $K_1$ in unit of symbols include appropriate support for desirable PUCCH resource allocation with only localised implementation impact, and the start symbol of PUCCH can be determined directly.

It will be appreciated that a PDSCH will only be included in a multiplexing window, if $N_1$ timeline towards the end of the multiplexing window can be satisfied (where $N_1$ is the number of OFDM symbols required for UE processing from the end of a PDSCH reception to the earliest possible start of the corresponding ACK/NACK transmission on PUSCH or PUCCH from UE perspective).

Given the low latency requirement of URLLC, the default timing interval between end of PDSCH multiplexing window $K_1$ and PUCCH should be as early as possible. For example, the PUCCH start symbol may be immediately after $K_1$ (satisfying $N_1$ UE processing time).

Beneficially, using the above method, it is possible to configure the PUCCH starting symbol implicitly based on $K_1$ indication without requiring further indication in DCI.

Determining Semi-Static and Dynamic HARQ Codebook

Figure 5:
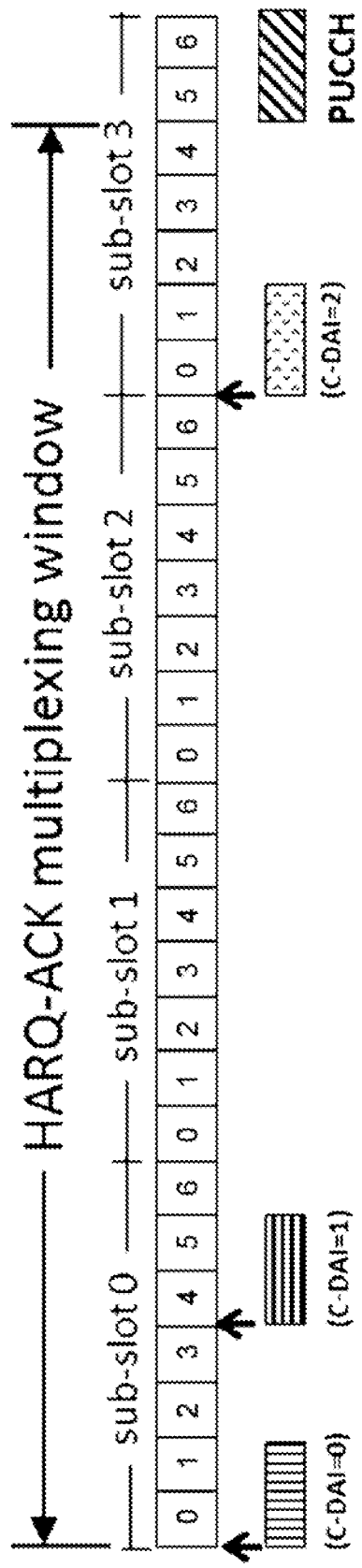
FIG. 5 illustrates schematically some exemplary ways in which semi-static and dynamic codebooks may be applied for multiple PDSCH reception, in accordance with exemplary embodiments of the present invention.

FIG. 5 illustrates schematically an exemplary way of using a semi-static codebook in accordance with the present exemplary embodiment.

In case of a semi-static codebook, the Release-15 mechanism specifies:
  ACK/NACK bits=1000100 0000000 0000000 10000
Contrastingly, the present system uses the following semi-static codebook:
  ACK/NACK bits=11 00 00 10
  sub-slot 0 (C-DAI=0; C-DAI=1)
  sub-slot 1 (C-DAI=2, C-DAI=3)
  sub-slot 2 (C-DAI=0, C-DAI=1)
  sub-slot 3 (C-DAI=2)

Let x be the maximum number of candidate PDSCH receptions per slot/sub-slot per carrier (or maximum number of HARQ-ACKs configured in a slot). x bits feedback (for each carrier) is always present in the semi-static codebook for each slot/sub-slot. In addition, C-DAI counter will also be present (already exist in DCI_format 1_0 and 1_1). This is also illustrated in FIG. 5 (note: x=2 per sub-slot in the example shown in this figure).

It will be appreciated that, with the PDCCH monitoring occasions per slot/sub-slot being increased to symbol level, the size of semi-static codebook can increase significantly. For a (relatively) bursty URLLC traffic, many bits in the semi-static codebook may not have a corresponding PDSCH transmission. This may in turn increase the transmission duration of the PUCCH channel and/or reduce the transmission efficiency of the semi-static codebook. Even though there are two HARQ-ACK codebooks constructed simultaneously (in case of two PUCCHs), the number of HARQ-ACK bits will not necessarily decrease (e.g. when the second codebook is for a different service type). Whilst some mechanisms may be considered for improving the transmission efficiency of the semi-static codebook (for example, shorter PUCCH multiplexing window may be used), they are not always feasible, especially for TDD, given the potentially limited PUCCH resources or UL slot format.

The use of a dynamic codebook beneficially improves the transmission efficiency of HARQ-ACK feedback, and the counter DAI value and the total DAI value can apply separately for each HARQ-ACK codebook per PUCCH. Currently, as there are only two bits for each counter, the reliability of the dynamic codebook may be compromised if the HARQ-ACK multiplexing window spans across more than four start timings/sub-slots. The following is a description of a potential way of improving reliability of the dynamic codebook for URLLC.

For Release-15 the relevant downlink assignment indicators 'C-DAI' and 'T-DAI' are defined as follows:
  C-DAI: A value of the counter downlink assignment indicator (DAI) field in DCI format 1_0 or DCI format 1_1 denotes the accumulative number of {serving cell, PDCCH monitoring occasion} pair(s) for PDSCH reception(s) associated with DCI format 1_0 or DCI format 1_1, up to the current serving cell and current PDCCH monitoring occasion, first in increasing order of serving cell index and then in increasing order of PDCCH monitoring occasion index.

T-DAI: The value of the total DAI, when present [TS 38.212], in DCI format 1_1 denotes the total number of {serving cell, PDCCH monitoring occasion} pair(s) in which PDSCH reception(s) associated with DCI format 1_0 or DCI format 1_1 is present, up to the current PDCCH monitoring occasion and shall be updated from PDCCH monitoring occasion to PDCCH monitoring occasion.

However, in this document, T-DAI is defined as follows:

T-DAI: The value of the total DAI, when present, in DCI format 1_1 denotes the total number of slot/sub-slot (s)/multiple-slots in which PDSCH transmission(s) associated with DCI format 1_1 occur(s), up to the current slot/sub-slot/multiple-slots, in increasing order of slot/sub-slot/multiple-slots index. Note that 'multiple-slots' is considered here for higher subcarrier spacing cases such as 120 kHz or more.

Figure 6:
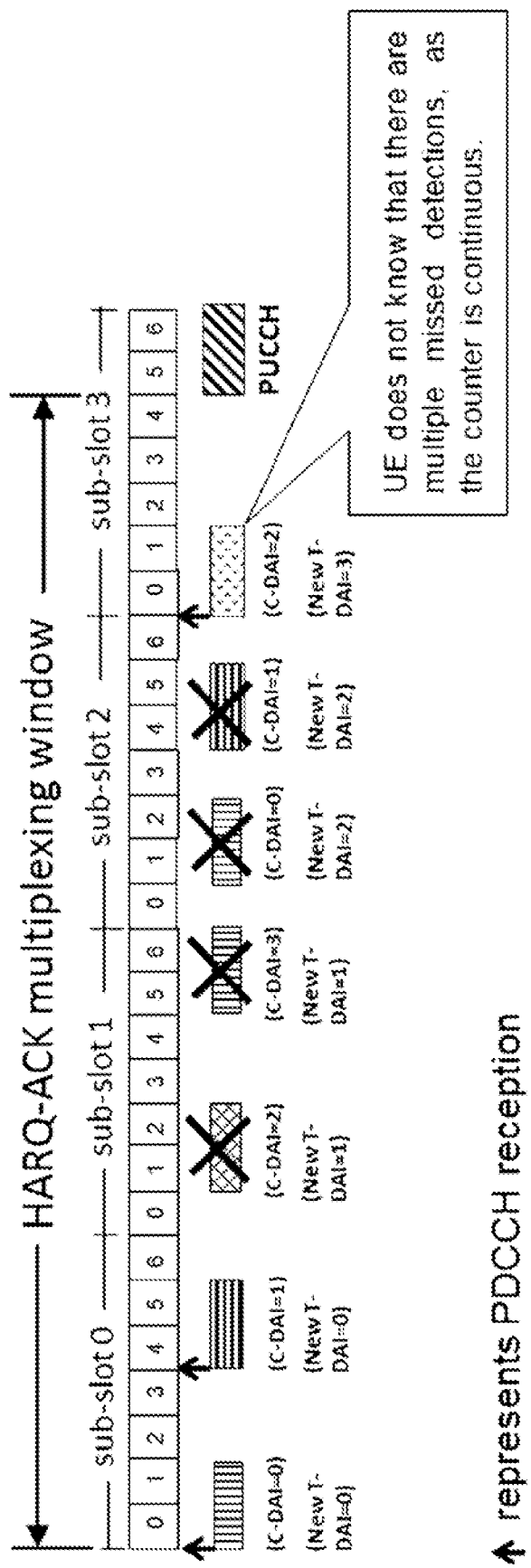
FIG. 6 illustrates schematically some exemplary ways in which semi-static and dynamic codebooks may be applied for multiple PDSCH reception, in accordance with exemplary embodiments of the present invention.
Figure 7:
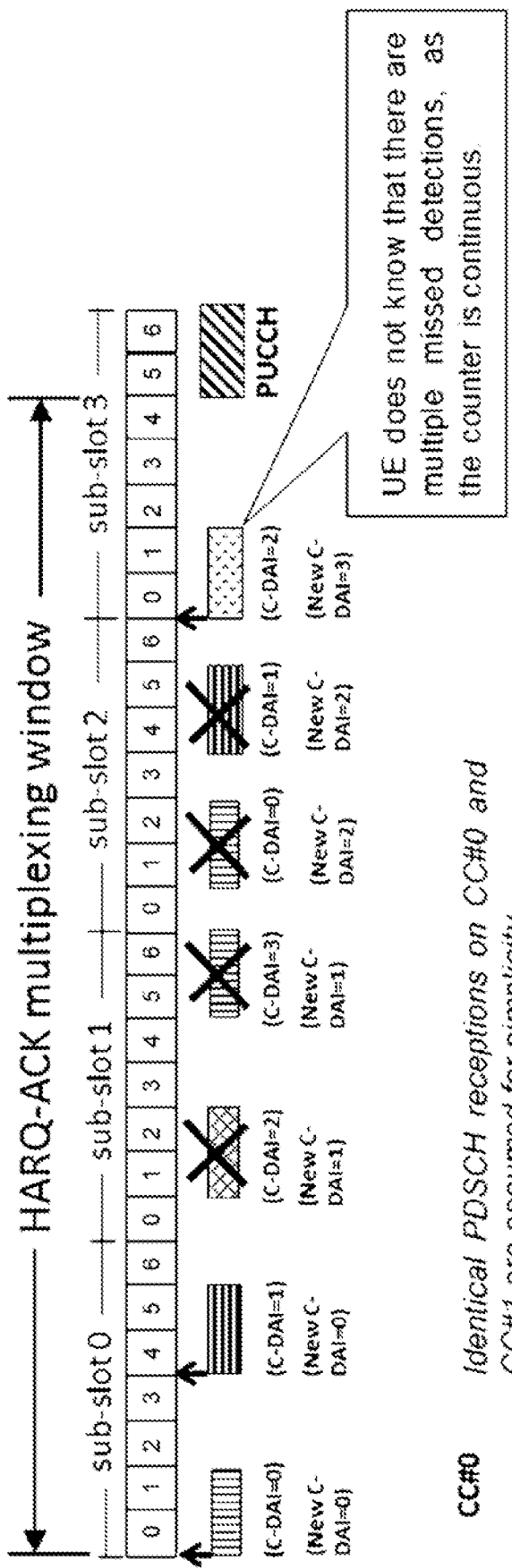
FIG. 7 illustrates schematically some exemplary ways in which semi-static and dynamic codebooks may be applied for multiple PDSCH reception, in accordance with exemplary embodiments of the present invention.

FIGS. 6 and 7 illustrate schematically some of the improvements resulting from the use of the newly defined C-DAI and T-DAI. Effectively, as the counters are continuous, the UE 3 is not aware of any missed detection (e.g. in the sub-slots/symbols between C-DAI=1 and C-DAI=2).

Beneficially, in this example, the maximum number of PDSCH transmissions (configured) per slot/sub-slot is used to determine the number of HARQ-ACK bits for each corresponding 'C-DAI' and 'T-DAI' value pair in a dynamic codebook. The number of PDSCH transmissions per slot is typically lower than the number of PDCCH monitoring occasions, considering PDSCH duration of 2,4,7 symbols.

In case of a dynamic codebook, the Release-15 mechanism specifies that:
ACK/NACK bits=11 1
sub-slot 0 (C-DAI=0, T-DAI=0; C-DAI=1, T-DAI=1)
sub-slot 1 (C-DAI=2, T-DAI=2; C-DAI=3, T-DAI=3)
sub-slot 2 (C-DAI=0, T-DAI=0; C-DAI=1, T-DAI=1)
sub-slot 3 (C-DAI=2, T-DAI=2)

Contrastingly, the present system uses the following dynamic codebook:
ACK/NACK bits=11 00 00 10
sub-slot 0 (C-DAI=0, T-DAI=0; C-DAI=1, T-DAI=0)
sub-slot 1 (C-DAI=2, T-DAI=1; C-DAI=3, T-DAI=1)
sub-slot 2 (C-DAI=0, T-DAI=2; C-DAI=1, T-DAI=2)
sub-slot 3 (C-DAI=2, T-DAI=3)

Let x be the maximum number of candidate PDSCH receptions (or maximum number of HARQ-ACKs configured) per slot/sub-slot per carrier. x bits feedback (for each carrier) is always present in the dynamic codebook for each value (pair) of C-DAI/(T-DAI). This is also illustrated in FIG. 6 (note: x=2 per sub-slot in the example shown in this figure).

A benefit associated with the above mechanism is that the reliability of the dynamic codebook may be improved (compared to Release-15).

Maximum Number of PUCCH Transmissions for HARQ-ACK in a Slot

Although the PDCCH monitoring occasions per slot can be increased to symbol level, the maximum number of PUCCH transmissions including HARQ-ACK in a slot may be specified for eMBB and URLLC respectively to meet the UE processing time constraints.

Consider the typical values of $N_1$ at 2.5, 5, or 10 symbols (where $N_1$ is the number of OFDM symbols required for UE processing from the end of a PDSCH reception to the earliest possible start of a corresponding ACK/NACK transmission on PUSCH or PUCCH), the number of PUCCH transmissions including HARQ-ACK bits associated for each carrier of each slot can be limited for URLLC services. However, in case of TDD, PUCCH transmission in a slot may be associated with PDSCHs of multiple slots. In addition, for the case of carrier aggregation, multiple HARQ-ACKs from multiple cells may be multiplexed on a PUCCH. Therefore, the number of PUCCH transmissions including HARQ-ACK bits per slot may need to be configurable.

When carrier aggregation is employed, the Release-15 mechanism for the dynamic codebook specifies that:
ACK/NACK bits=11 11 11
sub-slot 0 (C-DAI=0, T-DAI=1; C-DAI=1, T-DAI=1;
C-DAI=2, T-DAI=1; C-DAI=3, T-DAI=1)
sub-slot 1 (C-DAI=0, T-DAI=1; C-DAI=1, T-DAI=1;
C-DAI=2, T-DAI=1; C-DAI=3, T-DAI=1)
sub-slot 2 (C-DAI=0, T-DAI=1; C-DAI=1, T-DAI=1;
C-DAI=2, T-DAI=1; C-DAI=3, T-DAI=1)
sub-slot 3 (C-DAI=0, T-DAI=1; C-DAI=1, T-DAI=1)

Contrastingly, the present system uses the following dynamic codebook:
ACK/NACK bits=11 11 00 00 00 00 11 00
sub-slot 0 (C-DAI=0, T-DAI=0; C-DAI=1, T-DAI=0;
C-DAI=2, T-DAI=0; C-DAI=3, T-DAI=0)
sub-slot 1 (C-DAI=0, T-DAI=1; C-DAI=1, T-DAI=1;
C-DAI=2, T-DAI=1; C-DAI=3, T-DAI=1)
sub-slot 2 (C-DAI=0, T-DAI=2; C-DAI=1, T-DAI=2;
C-DAI=2, T-DAI=2; C-DAI=3, T-DAI=2)
sub-slot 3 (C-DAI=0, T-DAI=3)

Let x be the maximum number of candidate PDSCH receptions (or maximum number of HARQ-ACKs configured) per slot/sub-slot per carrier. x bits feedback is always present (for each carrier) in the dynamic codebook for each value (pair) of C-DAI/(T-DAI). Since URLLC traffic has typically small packets, it is not expected that large number of carriers are to be aggregated into a URLLC codebook. This is also illustrated in FIG. 7 (note: x=2 per sub-slot in the example shown in this figure).

Beneficially, using this approach, it is possible to configure the maximum number of PUCCH transmissions including HARQ-ACK bits allowed in a slot for URLLC.

Collision Handling of Multiple UL Channels

A prioritization rule may need to be defined when two or more PUCCHs/PUSCHs (PUxCHs) carrying 'ACK/NACK' overlap with each other. Generally, the Transport Block Size (TBS) and physical resources allocated for URLLC are limited. On the other hand, the overhead of eMBB UCI may be large, and the reliability of eMBB UCI is lower than that of URLLC PUSCH. If the UE 3 supports simultaneous transmissions of PUCCH and PUSCH, the multiple PUCCH channels may be transmitted in parallel in FDM manner, otherwise, the following time domain solution may be used:

If a UE 3 expects to transmit eMBB PUxCH with same first symbol as a URLLC PUxCH transmission, then the UE 3 may postpone the eMBB PUxCH until the URLLC PUxCH transmission completes.

If a UE 3 expects to transmit eMBB PUxCH during a URLLC PUxCH transmission, the UE 3 does not transmit the eMBB PUxCH until the URLLC PUxCH transmission completes.

If a UE 3 expects to transmit URLLC PUxCH during an eMBB PUxCH transmission, the UE 3 may puncture or rate-match the eMBB transmission in order to support the URLLC PUxCH transmission.

Beneficially, by postponing or rate-matching eMBB PUCCH/PUSCH transmission it is possible to avoid collision with URLLC transmission.

Modifications and Alternatives

Detailed exemplary embodiments have been described above. As those skilled in the art will appreciate, a number of modifications and alternatives can be made to the above exemplary embodiments whilst still benefiting from the inventions embodied therein. By way of illustration only a number of these alternatives and modifications will now be described.

It will be appreciated that the above exemplary embodiments may be applied to both 5G New Radio and LTE systems (E-UTRAN).

In the above description, the UE, the access network node (base station), and the core network node are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above exemplary embodiments, a number of software modules were described. As those skilled in the art will appreciate, the software modules may be provided in compiled or un-compiled form and may be supplied to the UE, the access network node (base station), and the core network node as a signal over a computer network, or on a recording medium. Further, the functionality performed by part or all of this software may be performed using one or more dedicated hardware circuits. However, the use of software modules is preferred as it facilitates the updating of the UE, the access network node, and the core network node in order to update their functionalities.

It will be appreciated that when control plane-user plane (CP-UP) split is employed, the base station may be split into separate control-plane and user-plane entities, each of which may include an associated transceiver circuit, antenna, network interface, controller, memory, operating system, and communications control module. When the base station comprises a distributed base station, the network interface (reference numeral 55 in FIG. 3) also includes an E1 interface and an F1 interface (F1-C for the control plane and F1-U for the user plane) to communicate signals between respective functions of the distributed base station. In this case, the communications control module is also responsible for communications (generating, sending, and receiving signalling messages) between the control-plane and user-plane parts of the base station. It will be appreciated that when a distributed base station is used there is no need to involve both the control-plane and user-plane parts for pre-emption of communication resources as described in the above exemplary embodiments. It will be appreciated that pre-emption may be handled by the user-plane part of the base station without involving the control-plane part (or vice versa).

The above exemplary embodiments are also applicable to 'non-mobile' or generally stationary user equipment. The above described mobile device may comprise an MTC/IoT device and/or the like.

The first DCI format (e.g. 'DCI format 1_0') may indicate the timing window to be shorter than a slot length. The second DCI format (e.g. 'DCI format 1_1') may indicate the timing window to be longer than a slot length.

The indication of at least one communication resource may indicate the position of at least one symbol or sub-slot within a slot that is the same as a slot in which said timing window ends. In this case, the indication of at least one communication resource may indicate the absolute position of at least one symbol or sub-slot within the slot in which said timing window ends. Alternatively, the indication of at least one communication resource may indicate the position of at least one symbol or sub-slot relative to a last symbol or sub-slot in which the downlink data is received within the slot in which said timing window ends.

The DCI may comprise a specific radio network temporary identifier (e.g. 'MCS-C-RNTI') for scheduling Ultra-Reliable and Low-Latency Communications (URLLC).

The at least one communication resource may immediately follow the timing window (optionally, with a delay of 'N1' Orthogonal Frequency Division Multiplexing (OFDM) symbols to allow for processing at the UE).

When the timing window spans more than one slot, the at least one communication resource may be given by a higher layer parameter (e.g. DL-data-DL-acknowledgement) comprising information identifying at least one symbol and/or at least one sub-slot. The method may comprise receiving information (e.g. a 'dl-DataToUL-ACK' information element in higher layer parameter Slot-symbol-timing-value-K1) indicating at least one of: a number of slots and a number of symbols/sub-slots between reception of the downlink data and transmission of a corresponding HARQ-ACK.

The timing window may be determined based on a union of slot index values (e.g. {0, 1}) and a set of symbol index values (e.g. {0,4,8,12}) or sub-slot index values (e.g. {0,1,2,3}).

The DCI may comprise a PUCCH resource indicator field ($\Delta$PRI), in which case the method may comprise: determining, for a Physical Uplink Control Channel (PUCCH), a starting communication resource in a slot comprising a set of communication resources to be equal to a value of the PUCCH resource indicator field ($\Delta$PRI); and transmitting, HARQ-ACK for the received downlink data, starting from the determined starting communication resource. The PUCCH may be for Ultra-Reliable and Low-Latency Communications (URLLC).

Various other modifications will be apparent to those skilled in the art and will not be described in further detail here.

Some of or all the above-described example embodiments can be described as in the following Supplementary Notes, but are not limited to the following.

(Supplementary Note 1)

A method performed by a user equipment (UE), the method comprising: receiving downlink control information (DCI) in accordance with at least one of a first DCI format and a second DCI format, the DCI indicating at least one communication resource to be used for transmitting Hybrid Automatic Repeat Request Acknowledgement (HARQ-ACK) feedback for downlink data at a symbol or sub-slot level, and the DCI format used indicating whether a timing window in which said downlink data is to be transmitted is shorter or longer than a slot length; receiving downlink data during said timing window; and transmitting HARQ-ACK for the received downlink data using the indicated at least one communication resource.

(Supplementary Note 2)

The method according to Supplementary Note 1, wherein the first DCI format (e.g. 'DCI format 1_0') indicates the timing window to be shorter than a slot length.

(Supplementary Note 3)

The method according to Supplementary Note 1 or 2, wherein the second DCI format (e.g. 'DCI format 1_1') indicates the timing window to be longer than a slot length.

(Supplementary Note 4)

The method according to any of Supplementary Notes 1 to 3, wherein the indication of at least one communication resource indicates the position of at least one symbol or sub-slot within a slot that is the same as a slot in which said timing window ends.

(Supplementary Note 5)

The method according to Supplementary Note 4, wherein the indication of at least one communication resource indicates the absolute position of at least one symbol or sub-slot within the slot in which said timing window ends.

(Supplementary Note 6)

The method according to Supplementary Note 4, wherein the indication of at least one communication resource indicates the position of at least one symbol or sub-slot relative to a last symbol or sub-slot in which the downlink data is received within the slot in which said timing window ends.

(Supplementary Note 7)

The method according to any of Supplementary Notes 1 to 6, wherein the DCI comprises a specific radio network temporary identifier (e.g. 'MCS-C-RNTI') for scheduling Ultra-Reliable and Low-Latency Communications (URLLC).

(Supplementary Note 8)

The method according to any of Supplementary Notes 1 to 7, wherein the at least one communication resource immediately follows the timing window (optionally, with a delay of '$N_1$' Orthogonal Frequency Division Multiplexing (OFDM) symbols to allow for processing at the UE).

(Supplementary Note 9)

The method according to any of Supplementary Notes 1 to 8, wherein when the timing window spans more than one slot, the at least one communication resource is given by a higher layer parameter (e.g. DL-data-DL-acknowledgement) comprising information identifying at least one symbol and/or at least one sub-slot.

(Supplementary Note 10)

The method according to any of Supplementary Notes 1 to 9, comprising receiving information (e.g. a 'dl-Data-ToUL-ACK' information element in higher layer parameter Slot-symbol-timing-value-K1) indicating at least one of: a number of slots and a number of symbols/sub-slots between reception of the downlink data and transmission of a corresponding HARQ-ACK.

(Supplementary Note 11)

The method according to any of Supplementary Notes 1 to 10, wherein the timing window is determined based on a union of slot index values (e.g. {0, 1}) and a set of symbol index values (e.g. {0,4,8,12}) or sub-slot index values (e.g. {0,1,2,3}).

(Supplementary Note 12)

The method according to any of Supplementary Notes 1 to 11, wherein the DCI comprises a PUCCH resource indicator field ($\Delta_{PRI}$), the method further comprising: determining, for a Physical Uplink Control Channel (PUCCH), a starting communication resource in a slot comprising a set of communication resources to be equal to a value of the PUCCH resource indicator field ($\Delta_{PRI}$); and transmitting, HARQ-ACK for the received downlink data, starting from the determined starting communication resource.

(Supplementary Note 13)

A method performed by a user equipment (UE), the method comprising: receiving downlink control information (DCI) comprising a PUCCH resource indicator field ($\Delta_{PRI}$); determining, for a Physical Uplink Control Channel (PUCCH), a starting communication resource in a slot comprising a set of communication resources to be equal to a value of the PUCCH resource indicator field ($\Delta_{PRI}$); and transmitting, HARQ-ACK for the received downlink data, starting from the determined starting communication resource.

(Supplementary Note 14)

The method according to Supplementary Note 13, wherein the PUCCH is for Ultra-Reliable and Low-Latency Communications (URLLC).

(Supplementary Note 15)

A method performed by a user equipment (UE), the method comprising: monitoring a series of Physical Downlink Control Channel (PDCCH) monitoring occasions; receiving, in a PDCCH monitoring occasion, downlink control information (DCI); receiving, over a Physical Downlink Shared Channel (PDSCH), downlink data corresponding to the DCI; and maintaining a codebook, for use in transmitting Hybrid Automatic Repeat Request Acknowledgement (HARQ-ACK) feedback for the downlink data, including: updating a first counter (e.g. 'C-DAI') based on an accumulative number of {serving cell, PDCCH monitoring occasion} pair(s) for PDSCH reception(s) associated with the DCI up to the current serving cell and current PDCCH monitoring occasion, first in increasing order of serving cell index and then in increasing order of PDCCH monitoring occasion index; and updating a second counter (e.g. 'T-DAI') based on a total number of slot/sub-lot(s)/multiple-slots in which PDSCH transmission(s) associated with the DCI occurred up to the current slot/sub-slot/multiple-slots, in increasing order of slot/sub-slot/multiple-slots index.

(Supplementary Note 16)

User equipment (UE) comprising: means for receiving downlink control information (DCI) in accordance with at least one of a first DCI format and a second DCI format, the DCI indicating at least one communication resource to be used for transmitting Hybrid Automatic Repeat Request Acknowledgement (HARQ-ACK) feedback for downlink data at a symbol or sub-slot level, and the DCI format used indicating whether a timing window in which said downlink data is to be transmitted is shorter or longer than a slot length; means for receiving downlink data during said timing window; and means for transmitting HARQ-ACK for the received downlink data using the indicated at least one communication resource.

(Supplementary Note 17)

User equipment (UE) comprising: means for receiving downlink control information (DCI) comprising a PUCCH resource indicator field ($\Delta_{PRI}$); means for determining, for a Physical Uplink Control Channel (PUCCH), a starting communication resource in a slot comprising a set of communication resources to be equal to a value of the PUCCH resource indicator field ($\Delta_{PRI}$); and means for transmitting, HARQ-ACK for the received downlink data, starting from the determined starting communication resource.

(Supplementary Note 18)

User equipment (UE) comprising: means for monitoring a series of Physical Downlink Control Channel (PDCCH) monitoring occasions; means for receiving, in a PDCCH monitoring occasion, downlink control information (DCI); means for receiving, over a Physical Downlink Shared Channel (PDSCH), downlink data corresponding to the DCI; and means for maintaining a codebook, for use in transmitting Hybrid Automatic Repeat Request Acknowledgement (HARQ-ACK) feedback for the downlink data, including: updating a first counter (e.g. 'C-DAI') based on an accumulative number of {serving cell, PDCCH monitoring occasion} pair(s) for PDSCH reception(s) associated with the DCI up to the current serving cell and current PDCCH monitoring occasion, first in increasing order of serving cell index and then in increasing order of PDCCH monitoring occasion index; and updating a second counter (e.g. 'T-DAI') based on a total number of slot/sub-slot(s)/multiple-slots in which PDSCH transmission(s) associated with the DCI occurred up to the current slot/sub-slot/multiple-slots, in increasing order of slot/sub-slot/multiple-slots index.

(Supplementary Note 19)

A computer implementable instructions product comprising computer implementable instructions for causing a programmable communications device to perform the method according to any of Supplementary Notes 1 to 15.

This application is based upon and claims the benefit of priority from United Kingdom Patent Application No. 1902166.6, filed on Feb. 15, 2019, the disclosure of which is incorporated herein in its entirety by reference.

What is claimed is:

1. A method performed by a user equipment (UE), the method comprising:
    receiving downlink control information (DCI) indicating at least one symbol-level or subslot-level communication resource to be used for transmitting Hybrid Automatic Repeat Request Acknowledgement (HARQ-ACK) feedback for downlink data;
    receiving a first downlink data and a second downlink data; and
    transmitting respective HARQ-ACK feedback for the first downlink data and the second downlink data using at least one respective symbol-level or subslot-level communication resource that is different from each other in one slot, the at least one respective symbol-level or subslot-level communication resource corresponding to the first downlink data and the second downlink data.

2. A user equipment (UE) comprising:
    at least one memory storing instructions; and
    at least one processor configured to process the instructions to:
    receive downlink control information (DCI) indicating at least one symbol-level or subslot-level communication resource to be used for transmitting Hybrid Automatic Repeat Request Acknowledgement (HARQ-ACK) feedback for downlink data;
    receive a first downlink data and a second downlink data; and
    transmit respective HARQ-ACK feedback for the first downlink data and the second downlink data using at least one respective symbol-level or subslot-level communication resource that is different from each other in one slot, the at least one respective symbol-level or subslot-level communication resource corresponding to the first downlink data and the second downlink data.

3. The method according to claim 1, wherein the at least one symbol-level or subslot-level communication resource is determined per the HARQ-ACK feedback.

4. The method according to claim 1, wherein the first downlink data and the second downlink data are associated with a respective priority, and
    wherein the HARQ-ACK feedback for at least one of the first downlink data and the second downlink data is suspended or stopped based on associated priority.

5. The UE according to claim 2, wherein the at least one symbol-level or subslot-level communication resource is determined per the HARQ-ACK feedback.

6. The UE according to claim 2, wherein the first downlink data and the second downlink data are associated with a respective priority, and
    wherein the HARQ-ACK feedback for at least one of the first downlink data and the second downlink data is suspended or stopped based on associated priority.

* * * * *